Jan. 5, 1965      B. W. ABRAMS      3,164,659

ACOUSTIC SYSTEM

Filed Nov. 16, 1961

INVENTOR.
BERNARD W. ABRAMS

BY
RICHEY, McNENNY & FARRINGTON
William J. Flynn
ATTORNEYS

United States Patent Office

3,164,659
Patented Jan. 5, 1965

3,164,659
ACOUSTIC SYSTEM
Bernard W. Abrams, South Euclid, Ohio, assignor to Clevite Corporation, a corporation of Ohio
Filed Nov. 16, 1961, Ser. No. 152,824
2 Claims. (Cl. 35—10.4)

This invention relates to an underwater simulated target acoustic echo repeating system.

In the training of naval personnel for submarine detection, a known technique has involved using relatively small underwater device, such as a torpedo body, to simulate a submarine. Because the device is much smaller than the submarine which it is supposed to simulate, it is not feasible to rely upon acoustic echoes reflected from the device to simulate the acoustic echoes which would be reflected from an actual submarine at the same distance. Instead, it is necessary to provide on the device a receiving transducer for receiving the acoustic energy from the signal source, an amplifier capable of greatly amplifying the received acoustic energy, and a sending transducer for sending the amplified signals back to the training ship as simulated submarine echoes.

Prior to the present invention a serious difficulty was encountered in the use of such systems because of the tendency to produce oscillations due to the feedback of acoustic energy through the water from the sending transducer on the device back to the receiving transducer on the device. The amplification of the actually received signal, which was required to produce a simulated submarine echo, was so great that in many cases the overall loop gain was greater than unity.

The present invention is directed to a novel arrangement in such a simulated echo repeating system which avoids this difficulty.

In accordance with the present invention, the frequency of the signals received by the receiving transducer on the target simulator (such as a torpedo body) are shifted in frequency, as well as being amplified, before being applied to the sending transducer on the target simulator. Because of this frequency shift, the problem of positive feedback between the sending and receiving transducers is effectively eliminated, while at the same time the acoustic signals transmitted by the sending transducer on the target simulator back to the training ship are sufficiently realistic simulations of the acoustic echoes which would be reflected from a submarine under the same conditions. Also, both the receiving and sending transducers on the target simulator may be relatively small, nondirectional and relatively inexpensive, as well as being spaced closely together.

It is an object of this invention to provide a novel and improved underwater simulated target acoustic echo repeating arrangement.

It is also an object of this invention to provide such an arrangement which prevents oscillation-producing acoustic feedback in a novel and advantageous manner.

Further objects and advantages of this invention will be apparent from the following detailed description of a presently-preferred embodiment thereof, which is illustrated schematically in the accompanying drawing.

Figure 1:
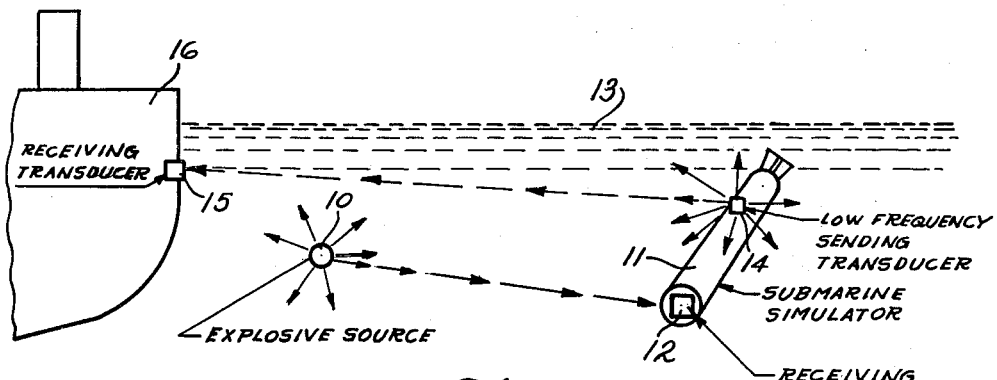
FIG. 1 illustrates schematically an underwater simulated target acoustic echo repeating system using a torpedo body to simulate a submarine.
Figure 2:
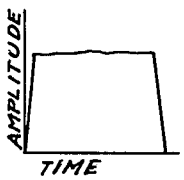
FIG. 2 shows a plot of amplitude versus time of the acoustic pressure from the explosive source used as the acoustic energy source in the system of FIG. 1.

Referring to FIG. 1, in accordance with known practice an explosive source 10 is used as the source of acoustic energy. It produces acoustic energy over a wide frequency band up to 30 kilocycles per second and higher. As indicated in FIG. 2, the acoustic energy output from the explosive source initially has approximately a square wave pattern of acoustic pressure with respect to time. As can be demonstrated by Fourier analysis, this square wave is composed of a sinusoidal fundamental low frequency signal and a plurality of sinusoidal harmonics thereof, with the harmonics having a predetermined amplitude ratio with respect to one another.

The submarine simulator, which is used as a simulated target for this acoustic energy, is a small device 11 having a suitable propulsion source and steering control for causing it to move through the water. In its nose the device carries an electroacoustic receiving transducer 12, which receives some of the acoustic energy transmitted through the water 13 from the acoustic source 10 and converts it into electrical signals of corresponding amplitude and frequency. Also mounted on the torpedo body, at a suitable location spaced from its nose, is an electroacoustic sending transducer 14, whose function is to transmit acoustic energy through the water to an electroacoustic receiving transducer 15 on the training ship or aircraft 16. The acoustic energy received by transducer 15 on the ship or aircraft from the sending transducer 14 on the target simulator is supposed to simulate the acoustic echoes which would be reflected from a submarine at the same distance from the acoustic source 10 and the training ship or aircraft as the target simulator 11.

In accordance with the present invention, the target simulator 11 also carries suitable circuitry for both amplifying and shifting the frequency of the acoustic energy received by its receiving transducer 12 to be transmitted from its sending transducer 14 back through the water to the receiving transducer 15 on the training ship or aircraft.

Figure 3:
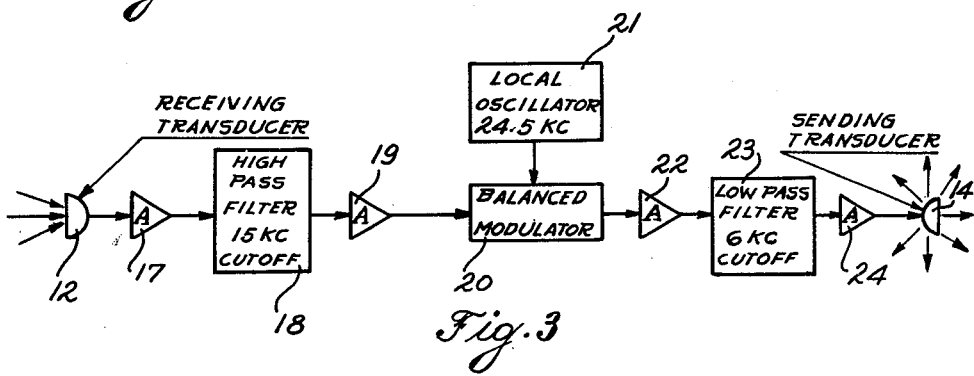
FIG. 3 is a schematic block diagram of the amplifying and frequency-shifting circuit connected between the receiving and sending transducers on the device in accordance with a preferred embodiment of the present invention.

Referring to FIG. 3, in a preferred embodiment the receiving transducer 12 on the target simulator has its output coupled through a suitable amplifier 17 to a high pass filter 18. This filter has a lower cutoff frequency of 15 kilocycles per second, so that it passes only the high frequency (above 15 kc.) harmonics of the acoustic energy received by transducer 12.

The output from the filter 18 is passed through an amplifier 19 to one input of a balanced modulator 20 of known design. The balanced modulator has a second input from a 24.5 kc. local oscillator 21. In the modulator 20 these two signals are combined by being heterodyned against each other. The output from modulator 20 contains only the sum and difference of the input frequencies, the fundamental input frequencies themselves being suppressed.

The sum and difference frequency outputs from modulator 20 are passed through suitable amplifier stages 22 to a low pass filter 23. The latter has a 6 kc. upper cutoff, so that it passes only the heterodyne difference frequency signals below 6 kc. From this filter the signals are passed through a power amplifier 24 to the sending transducer 14.

With this arrangement, the signals transmitted by the sending transducer 14 on the target simulator are primarily within the low frequency band from 3 kc. to 6 kc. However, it should be noted that they are amplified replicas of the higher frequency harmonics (above 15 kc.) actually received by the receiving transducer 12 on the target simulator from the acoustic source 10.

However, since these actual higher frequency harmonics have an amplitude proportional to the amplitude of the actual lower frequency harmonics produced by the acoustic source 10, the amplified low frequency signals from transducer 14 provide an adequate simulation of the echoes of the lower frequency harmonics which would be produced if the target 11 were an actual submarine.

Because of the frequency shift provided by the present invention, oscillations due to acoustic feedback from transducer 14 through the water back to transducer 12 are avoided despite the great amplification of the signals applied to transducer 14 and the relatively close physical spacing between transducers 12 and 14 due to the fact that both are mounted on a relatively small target simulator 11. Both transducers 12 and 14 may be non-directional, which reduces their size and cost.

While a specific presently-preferred embodiment of this invention has been described in detail and illustrated in the accompanying drawing, it is to be understood that various modifications, omissions and refinements which depart from the disclosed embodiment may be adopted without departing from the spirit and scope of this invention. For example, the acoustic source may be a sonar transmitter on the training ship, instead of an explosive source. Also, the frequency-shifting and amplifying circuit may differ from the particular arrangement disclosed.

What is claimed is:

1. In an underwater simulated target acoustic echo repeating system, a relatively small underwater device intended to simulate a submarine, an electroacoustic receiving transducer on said device, an electroacoustic sending transducer on said device, and circuit means on said device connected between the receiving transducer and the sending transducer and comprising a high pass filter coupled to the output of said receiving transducer for passing only those signals received by the latter which are above a predetermined cutoff frequency, a local oscillator, means for heterodyning said local oscillator against the signals passed by said high pass filter, a low pass filter coupled to the output of said heterodyning means and having a cutoff frequency substantially below said cutoff frequency of the high pass filter, means coupling the output of said low pass filter to the input of said sending transducer, and amplifier means in the circuit between said receiving transducer and said sending transducer.

2. In an underwater simulated target acoustic echo repeating system, a relatively small underwater device intended to simulate a submarine, an electroacoustic receiving transducer on said device, an electroacoustic sending transducer on said device, and circuit means on said device connected between the receiving transducer and the sending transducer and comprising a first filter coupled to the output of said receiving transducer for passing only those signals received by the latter which are at one side of a predetermined cutoff frequency, a local oscillator, means for heterodyning said local oscillator against the signals passed by said first filter, a second filter coupled to the output of said heterodyning means and having a cutoff frequency substantially different from said cutoff frequency of the first filter, means coupling the output of said second filter to the input of said sending transducer, and amplifier means in the circuit between said receiving transducer and said sending transducer.

References Cited in the file of this patent
UNITED STATES PATENTS

| | | |
|---|---|---|
| 2,017,126 | Kroger | Oct. 15, 1935 |
| 2,694,868 | McMillan et al. | Nov. 23, 1954 |
| 2,710,458 | Reed | June 14, 1955 |
| 2,838,850 | Stephenson et al. | June 17, 1958 |
| 2,887,671 | Frankel et al. | May 19, 1959 |
| 2,918,650 | Carruthers et al. | Dec. 22, 1959 |
| 3,048,814 | Francois | Aug. 7, 1962 |
| 3,076,519 | Alsabrook | Feb. 5, 1963 |